Oct. 6, 1959   D. E. GULICK   2,907,591
HOSE COUPLING HAVING BAYONET TYPE JOINING MEANS
Filed Oct. 14, 1957
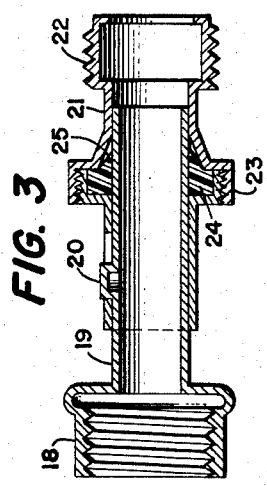
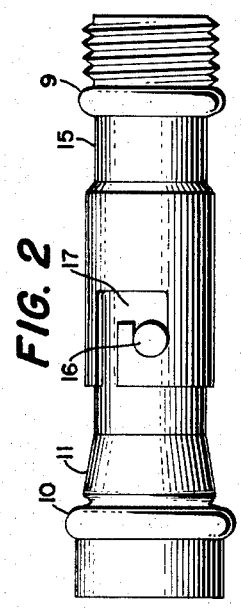
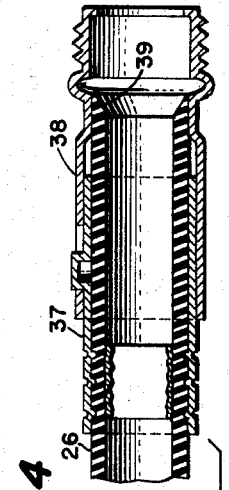
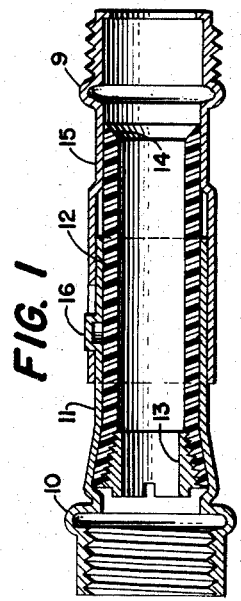
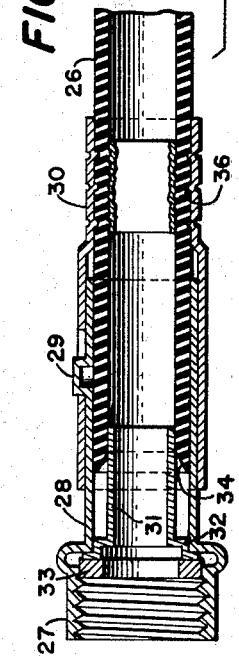
INVENTOR
DAVID E. GULICK
BY *Joseph F. Gulick*
ATTORNEY

United States Patent Office 2,907,591
Patented Oct. 6, 1959

2,907,591

HOSE COUPLING HAVING BAYONET TYPE JOINING MEANS

David E. Gulick, Los Altos, Calif.

Application October 14, 1957, Serial No. 689,833

3 Claims. (Cl. 285—174)

This invention relates to hose couplings.

An object of the invention is to provide a hose coupling so constructed as to make it more practical, more convenient and, therefore, more adaptable for use in coupling hose to a water spigot than devices heretofore known.

Another object is to provide a hose coupling which by virtue of its simplicity will be inexpensive to make and yet efficient in use.

In hose couplings heretofore known it has been somewhat inconvenient to connect and disconnect the hose to the water connection. With the invention herein disclosed this is relatively simple because the hose coupling is made in two separable parts, one of which is secured, more or less permanently to the water spigot and the other of which is attached to the hose by the usual threaded connection, the separable parts being secured together by a bayonet connection which makes the parts readily separable, leaving one member attached to the water spigot and the other attached to the hose.

Other objects and advantages will become apparent from the description which follows and from the illustrations in the drawings, in which:

Fig. 1 is a longitudinal sectional view of one form of the hose coupling;

Fig. 2 is a side view of the form shown in Fig. 1;

Fig. 3 is a longitudinal sectional view of a modified form of hose coupling; and Fig. 4 is a further modified form in which the coupling is formed of two members, one member of which is connected at one end to the hose and connected to a water spigot and the other member is connected to the other end of the hose and adapted to have a hose nozzle connected thereon.

In the form of the invention as shown in Fig. 1, the connector is made of two separable members 9 and 10. The member 9 has a conventionally threaded end to which a hose may be attached in well known manner. The member 10 is adapted to be connected to a water spigot. The member 10 has a tubular extension 11 in which is fitted a rubber or other suitable resilient or flexible tubular member 12. A plug 13 is screwed into the end of the flexible member to effect a seal between flexible tube and the inner wall of the extension 11. The member 9 has an extending sleeve 15 into which the part 11 extends. The tube 11 has a radially extending boss 16 which is adapted to engage in a bayonet slot 17 in the sleeve 15. The end of the flexible tube 12 is beveled as shown at 14. Due to this beveled construction a fluid seal is effected between the flexible tube 12 and the inner wall of the sleeve 15 due to the pressure of the water on the beveled portion on the end of the tube.

In operation the part 10 is screwed upon the threaded portion of a water spigot, not shown. The screw threaded portion, on the end of the member 9, receives a conventional fitting on the end of a hose, not shown. The parts 9 and 10 are secured together by the bayonet connection 16 and 17. As is apparent the parts may be readily connected and disconnected. When disconnected the part 9 will remain connected to the hose and the part 10 will remain connected to the water spigot. Other units such as 10 will be secured on other spigots in the yard or lawn so that the hose may be moved from place to place and connected to any other spigot which may be in the yard.

In the form shown in Fig. 3 a threaded portion 18 is secured on the threaded portion of a spigot, not shown. The portion 18 has an extended tubular portion 19 and this extended portion has a radial boss 20. A separable portion 21 is provided with a bayonet slot such as that in Fig. 1 in which the boss 20 engages to secure the sections 19 and 20 together. The section 21 is provided with threads 22 to which a conventional coupling on a hose is connected. The section 21 is made separable and the adjacent ends are enlarged as at 23 and screw threaded together. A resilient gasket 24 is held between the enlarged ends. The gasket is provided with a beveled portion 25 to effect a fluid seal between part 19 and the inner portion of the part 21.

As in the case of Fig. 1 the parts 19 and 21 are easily connected and disconnected due to the bayonet connection.

In the form shown in Fig. 4 separable connectors are secured to each end of a hose 26. In this form the threaded portion 27 of the member 28 may be connected to a water spigot, not shown. The member 28 carries a radial boss 29 which engages in a bayonet slot in the adjacent section 30. A tubular insert 31, having an enlarged end 32, seats in the end threaded portion 27. The tubular insert extends into the end of the hose 26 and the end of the hose is beveled at 34 to effect a fluid seal as in the case of the other beveled structures. A conventional sealing washer 33 is positioned in the threaded end 27. The member 30 is secured on the hose by crimping as shown at 36.

The other end of the hose 26 is provided with a separable connector composed of members 37 and 38 similar to the members 19 and 20. In this connector the tubular insert 31 is omitted since the fitting on the nozzle, not shown, is screwed on the outer threads of the connector. In this form also the end of the hose is beveled as at 39.

While several forms of the basic invention have been shown and described, these are only illustrative of the possibilities of various embodiments of the invention. The illustrations, therefore, are not to be construed as limiting the possibilities of the forms which the invention may take, it being understood that the invention is limited only by the scope of the appended claims.

What I claim is:

1. A hose coupling comprising two tubular members, each being integral and of substantially uniform wall thickness throughout and having a relatively long tubular extension telescopingly engaging one within the other, the outer end of one of the members having formed thereon a female threaded portion adapted to engage a male threaded portion of a water spigot, the outer end of the other member having a threaded portion adapted to receive the female portion of a hose coupling, a J-shaped slot in said extension of the outer member extending from the inner end thereof and a radially outwardly formed boss on the wall of the extension of said inner member forming a bayonet connection for releasably holding the extensions in telescoped position, a relatively long flexible sleeve engaging the inner surface of said inner tubular extension and secured at one end in said inner member between said tubular extension and its threaded portion and extending into the outer member, said outer member having a portion with an inner diameter equal to the inner diameter of said inner tubular extension and engaging the extending portion of said sleeve to provide a fluid seal between the telescoped portions of the tubular extensions.

2. The invention as claimed in claim 1 wherein a tapered threaded hollow plug is in one end of the sleeve to secure the end of the sleeve in fluid contact with inner tubular member.

3. The invention as claimed in claim 2 wherein the end of the sleeve which extends into the outer tubular member is beveled outwardly to effect a fluid seal between the end of the sleeve and the inside of the outer tubular member.

References Cited in the file of this patent

UNITED STATES PATENTS

| | | |
|---|---|---|
| 242,564 | Sholder | June 7, 1881 |
| 578,150 | Kerns | Mar. 2, 1897 |
| 943,900 | Smith | Dec. 21, 1909 |
| 1,092,673 | Stephens | Apr. 7, 1914 |
| 1,120,340 | Smith | Dec. 8, 1914 |
| 1,212,817 | Russell | Jan. 16, 1917 |
| 1,589,469 | Homand | June 22, 1926 |
| 2,047,714 | Smith | July 14, 1936 |
| 2,415,472 | Dorman | Feb. 11, 1947 |
| 2,416,657 | Trevaskis | Feb. 25, 1947 |
| 2,421,228 | White | May 27, 1947 |
| 2,573,982 | Ofeldt | Nov. 6, 1951 |
| 2,733,940 | Millar | Feb. 7, 1956 |
| 2,798,745 | Nelson | July 9, 1957 |